United States Patent [19]
Poilâne

[11] Patent Number: 5,458,415
[45] Date of Patent: Oct. 17, 1995

[54] APPARATUS FOR MAKING BREAD

[75] Inventor: Lionel Poilâne, Paris, France

[73] Assignee: B. F. E. Limited, Dublin, Ireland

[21] Appl. No.: 217,368

[22] Filed: Mar. 24, 1994

[30] Foreign Application Priority Data

Mar. 29, 1993 [IE] Ireland ..................... 0252/93

[51] Int. Cl.$^6$ ................ B01F 15/04; A21B 7/00; A21C 1/00
[52] U.S. Cl. .............. 366/138; 99/354; 99/355; 99/443 C; 99/478; 366/145; 366/156.2; 366/158.4; 366/160.1
[58] Field of Search ................. 99/352–355, 386, 99/443 C, 404, 339, 340, 477–479; 126/21 A, 41 C; 222/146.1, 146.6; 366/79, 96–99, 138, 144–146, 160, 167, 168, 177

[56] References Cited

U.S. PATENT DOCUMENTS

| | | | |
|---|---|---|---|
| 2,953,460 | 9/1960 | Baker | 366/300 |
| 3,815,489 | 6/1974 | Reid, Jr. et al. | 99/339 |
| 3,882,768 | 5/1975 | Troisi et al. | 99/352 |
| 4,028,024 | 6/1977 | Moreland | 99/450.6 |
| 4,061,314 | 12/1977 | Schmader | 99/354 |
| 4,176,589 | 12/1979 | Stuck | 99/386 |
| 4,962,695 | 10/1990 | Northrup, Jr. | 99/443 C |

FOREIGN PATENT DOCUMENTS

| | | |
|---|---|---|
| 0113327 | 2/1988 | European Pat. Off. . |
| 0131264 | 9/1989 | European Pat. Off. . |
| 0243364 | 10/1989 | European Pat. Off. . |
| 0359639 | 3/1990 | European Pat. Off. . |
| 2332793 | 6/1977 | France . |
| 2389947 | 12/1978 | France . |
| 2515001 | 2/1984 | France . |
| 1201365 | 8/1970 | United Kingdom . |
| 2257889 | 1/1993 | United Kingdom . |
| WO84/02449 | 7/1984 | WIPO . |

Primary Examiner—Timothy F. Simone
Attorney, Agent, or Firm—Bell, Seltzer, Park & Gibson

[57] ABSTRACT

A process for making bread is carried out in an apparatus which includes a kneader for kneading flour, yeast and water into dough and a pump for continuously feeding the mixed dough through flexible pipe to a cutting device which forms dough pieces. The apparatus also includes chains for transporting the dough pieces in receptacles along a sinuous path in a fermentation chamber to an oven where bread is formed. A solenoid valve is also included which injects water via tubular elements integrated with the kneader and pump to allow the dough to be more fluid. Water is again injected after delay to allow for self-cleaning of the pump and kneader. Water is also injected by a separate solenoid valve into the flexible pipe to clean such.

11 Claims, 9 Drawing Sheets

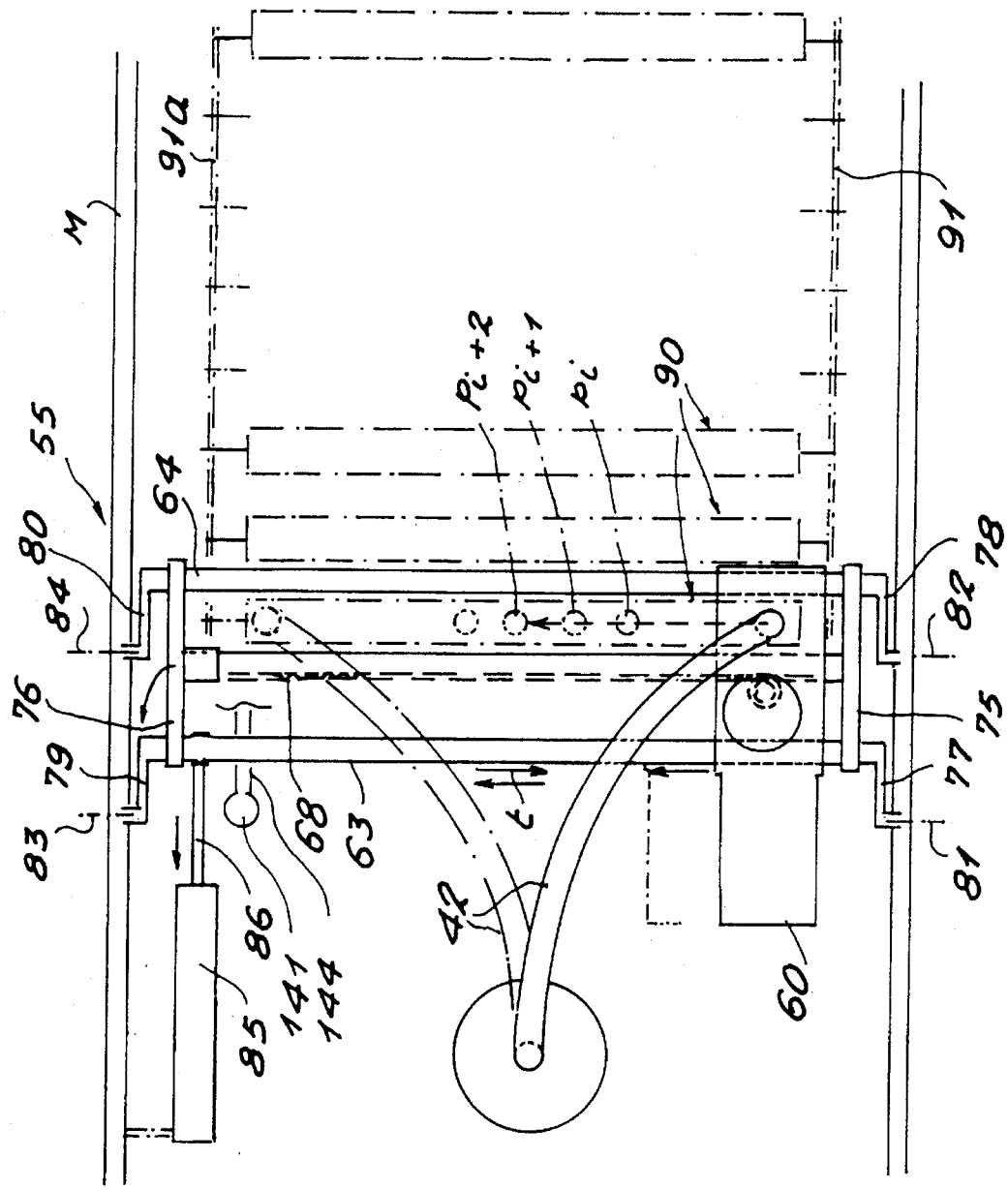

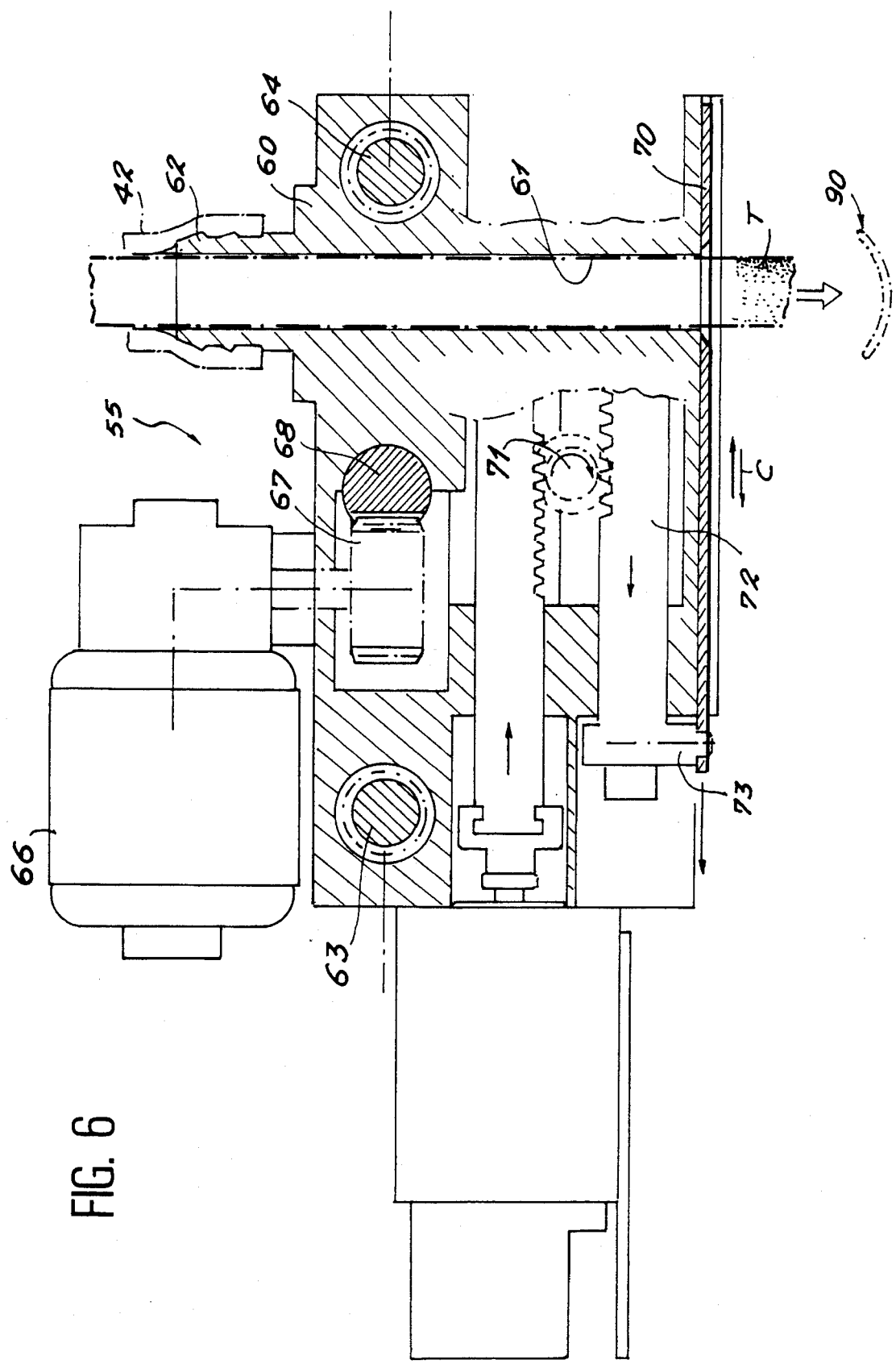

APPARATUS FOR MAKING BREAD

FIELD OF THE INVENTION

The invention relates to a panification process and machine which are suitable for being implemented under the most varied or the most difficult climatic conditions of use, with a very short time delay after starting the machine which, in addition, can be easily transported, so that the bread can be produced in large quantities in order to meet the needs of famine-struck populations requiring aid.

BACKGROUND OF THE INVENTION

Bread manufacture, or panification, includes three principal operations: the kneading operation intended to convert the flour and water into dough, at least two fermentations, and the baking which converts the fermented dough into bread. To these three principal operations are added several handling sub-operations such as weighing, cutting up of pieces or forming, which enable the future loaves to be shaped. This manufacturing is relatively labour-intensive and has to be performed under sometimes difficult night-time working conditions, and this is why attempts have already been made to overcome these constraints by providing automatic panification machines as described, for example, in FR-A-2,515,001 or in U.S. Pat. No. 4,061,314 whose subject is a doughnut-making machine, that is to say a field which, whilst being different from panification, sometimes poses similar problems.

Automatic bread-manufacturing apparatuses have already been provided, see for example that marketed under the reference HB B100 of the HITACHI Company and those described in EP-0,243,364, WO-84/02449, EP-0,131,264 or EP-0,113,327 and which are provided for domestic use in the housewife's kitchen. Such apparatuses essentially comprise a container into which the ingredients (flour, salt, water, yeast, etc.) are put manually and then mixed therein, the baking being performed in the same container or in a stationary additional container and then extracted from the apparatus in order to withdraw and release the bread thus manufactured. It goes without saying that such apparatuses are completely inappropriate for a use intended to satisfy a large demand for bread, whereas known industrial installations are either not entirely automatic and do not operate continuously, such as that described in FR-A-2,515,001, or are complicated large installations which require both workforces to use them and workforces to maintain them, in order to satisfy the obligatory hygiene and inspection conditions imposed in industries manufacturing products for human consumption.

The problem which is posed, consequently, is to supply a panification process and machine which palliate the disadvantages of the known processes and machines.

It is, consequently, a general object of the invention to provide a solution to this problem by proposing a process and a machine using which products as varied and of as good a quality as those from conventional panification can be obtained whilst allowing industrial-type automatic and continuous use.

In addition, it is an object of the invention to provide a process and a machine which enable, starting from basic raw materials which vary depending on the origin of the supplies specific to each culture, the manufactured products to be modified as required, in particular as regards their organoleptic qualities, their shapes, their weights and, in general, their characteristics, so as to render the said products as close as possible to the taste and eating habits of the populations which benefit therefrom.

It is, furthermore, an object of the invention to supply a versatile machine which operates entirely automatically and continuously, has a relatively limited overall size and which, consequently, can be installed in places of use where the space available is limited, for example ships, but, in addition, in a completely different context, restaurant installations for public or private organisations or even places of use which are inhospitable on account of their climatic conditions.

It is, likewise, an object of the invention to provide a compact machine requiring only little energy for its operation and whose dimensions are such that it can be transported, with the usual handling means, to places where food supplies do not exist or exist no longer, for example following a natural disaster or the like, and which, as soon as it is installed and put into operation, enables bread to be supplied in large quantity.

SUMMARY OF THE INVENTION

The bread-manufacturing process according to the invention, in which a dough is prepared by kneading and fermented-dough pieces are baked, is characterised, in a first aspect, by a step of kneading and pumping of said dough in kneader and pump means, respectively, which means are designed with integrated self-cleaning means.

The automatic and continuous manufacture makes it possible to obtain, without interruption, a large quantity of dough shaped into dough pieces which, after fermentation, are converted into bread products, whereas the kneading using a atmospheric kneader/pump, and consequently very different from the extrusion devices operating at high pressure, enables a dough of excellent quality to be obtained under good conditions and in a relatively short time, all the obligatory hygiene conditions being simultaneously satisfied because of the presence of the self-cleaning means integrated in the atmospheric kneader/pump which can be easily and completely cleaned after each manufacturing run.

Likewise, according to the invention, the shaping of the dough pieces is performed before the fermentation and directly after kneading on leaving the atmospheric kneader/pump, without a resting phase, as in the usual and conventional panification processes.

Another characteristic of the process according to the invention makes provision to carry out the dough manufacture within a predetermined temperature range, advantageously of the order of 30° to 40° C., irrespective of the climatic conditions of the place of implementation of the process.

Such an arrangement enables water-vapour condensation phenomena to be avoided, which could be the cause of the formation of flour and water aggregates hindering correct operation of the machine and the even flow of the flour and yeast out of their respective bins, and satisfactory cleaning.

According to another characteristic of the invention, the ratios of the salted-flour/yeast/water mixture are selected as a function of the bread products desired to be manufactured and means making it possible to adjust the delivered quantities of salted flour and yeast are controlled accordingly.

According to another aspect, the panification process according to the invention is likewise characterised by the fact that provision is made for the flour to be dropped from a predetermined height between its outlet from the bin, where it is stored, and the inlet of the atmospheric kneader/pump.

Likewise, according to the invention, the dough pieces, shaped after kneading, travel in a fermentation chamber where the path is sufficiently long so that the dough "rises" satisfactorily before the dough pieces are put into an oven, adjacent to the fermentation chamber, from which the bread products leave after baking.

For the cleaning phase, the invention makes provision to modify the ratio of the flour/yeast/water mixture in order to render the continuously-manufactured dough more fluid and then, after a delay period, to carry out a washing operation using clarified water.

A panification machine according to the invention thus comprises, besides the presalted-flour and yeast bins:

means for controlling the quantities of salted flour and yeast which are delivered from these bins;

means for feeding the flour and yeast towards a kneader where the necessary water is also supplied in appropriate quantity;

a pump and transfer means for continuously feeding the dough, mixed and kneaded in the kneader/pump, towards a cutting device in order to form dough pieces;

self-cleaning means integrated into the kneader/pump and means for the cleaning of said transfer means for feeding the dough and of the device for cutting it;

receptacles for the dough pieces, connected to conveyor means which make them travel first along a sinuous path in a fermentation chamber and then in an oven; and means for controlling the unloading of said receptacles to ensure that they are empty before said receptacles, continuing their movement, are brought again to a loading station for dough pieces.

In a favoured construction of bread-manufacturing machine according to the invention, the feeding of the flour and yeast is by gravity and the transfer means is a deformable pipe.

In a preferred embodiment of the invention, the water supplied to the kneader/pump is at a pre-established temperature and is heated using a coil placed in the vicinity of means for heating the fermentation chamber.

In order to maintain a predetermined temperature range in the dough-manufacturing zone, this lying advantageously between 30° and 40° C., provision is made to fit the machine according to the invention with means for regulating the said temperature within the said predetermined range.

The invention also makes provision to connect to the atmospheric kneader/pump a pressure sensor which makes it possible to regulate the quantity of dough supplied by the pump towards the cutting device.

In a preferred embodiment of the machine, the receptacles for the dough pieces are swing trays, the longitudinal ends of which are rigidly connected to two synchronous chains forming said conveyor means with, at the outlet of the machine, toothed and notched wheels which cause the said swing trays to be turned upside down, thus guaranteeing that the baked bread products are effectively unloaded from the swing trays so that, on the return side of the chains, the said swing trays are empty and suitable for once again receiving, when they arrive at the dough-piece dispensing station, new mixed or kneaded masses of dough for continuous operation.

Also connected to the machine are programming means for controlling it according to automatic-operation cycles selected as required from among the multiplicity of those offered to the user such as the shape (especially the length) and the weight of the bread products, their composition, the hours of operation, in particular the start-up times of the machine, the counting of the manufactured products, the cleaning cycles, etc.

In a preferred embodiment of the machine, the integrated self-cleaning means for the kneader/pump comprise means for the cleaning of a screw of the kneader, of an end blade of said screw and of a mixing finger, together with means for peripheral cleaning of the pump, whereas the means for the cleaning of the transfer means (deformable pipe) for feeding the dough and of the device for cutting or shaping the dough pieces include a chute and a pump for draining cleaning water flowing into a channel passing through a movable carriage when the latter is in a cleaning position.

BRIEF DESCRIPTION OF THE DRAWINGS

Other characteristics and advantages of the invention will appear from the description which follows, given by way of example and with reference to the attached drawings in which:

FIGS. 5 and 5A are diagrammatic plan views corresponding to that of FIG. 4;

FIG. 6 explains the means shown in FIGS. 4 and 5;

DESCRIPTION OF THE PREFERRED EMBODIMENTS

Figure 1:
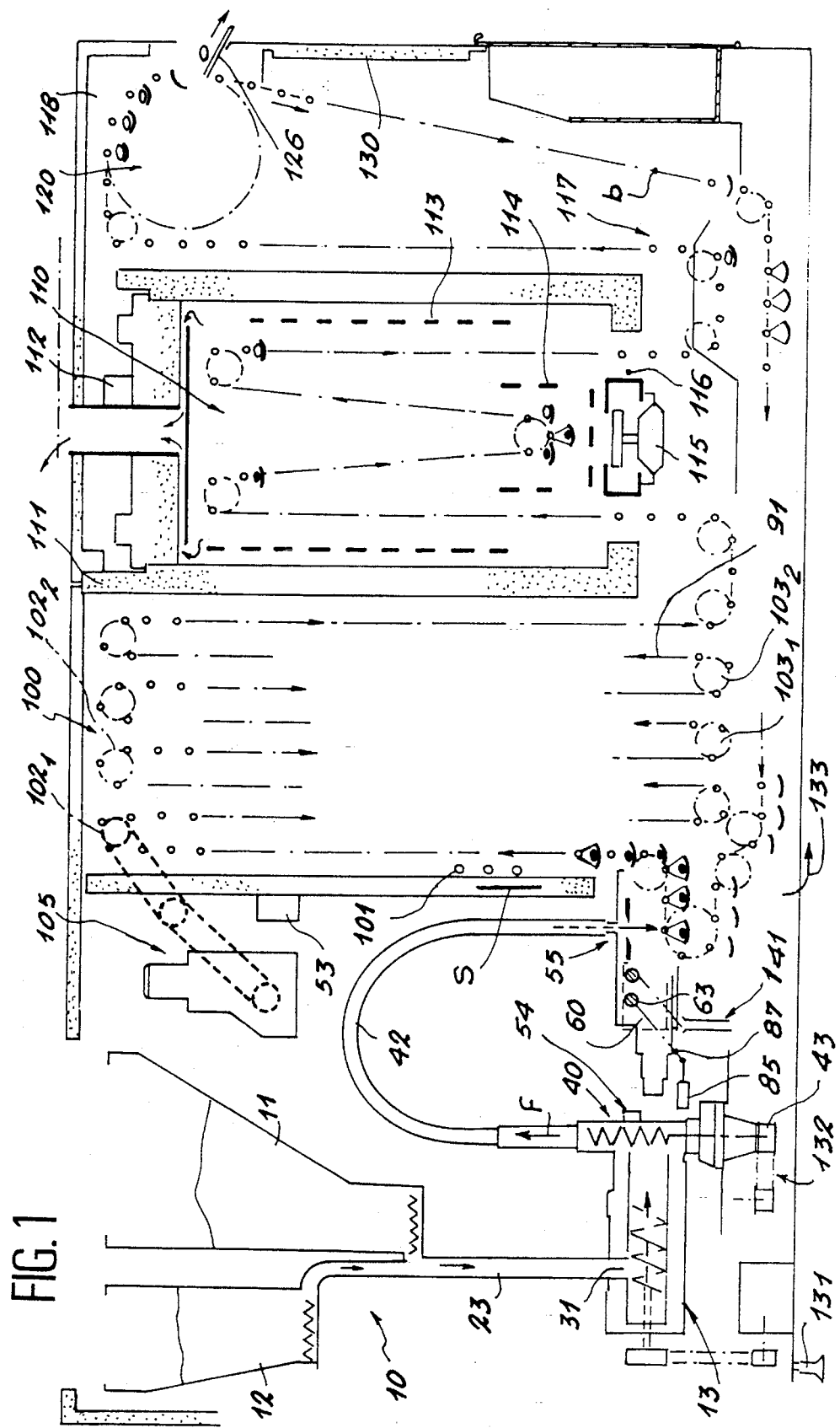
FIG. 1 is a highly-diagrammatic view, in longitudinal section, of a machine according to the invention.
Figure 2:
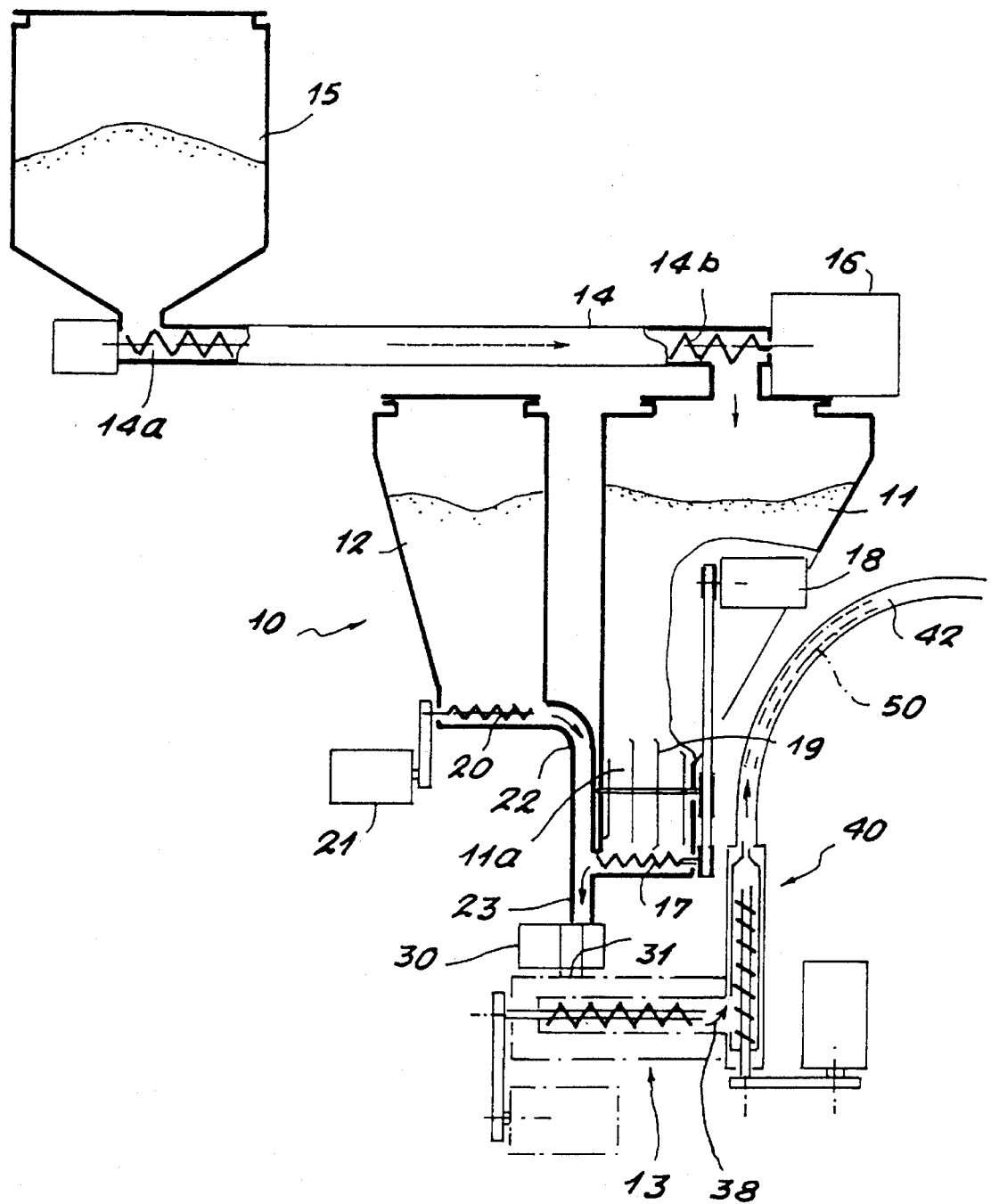
FIG. 2 is a diagrammatic view of the dough-manufacturing means.

Reference is firstly made to FIGS. 1 and 2 which illustrate, diagrammatically, a panification process and machine according to the invention which are intended for a use enabling large quantities of bread to be supplied, contrary to domestic apparatuses such as may be encountered in the housewife's kitchen, but which do not have the disadvantages, nor the dimensions of the known industrial panification installations. The machine comprises a station 10, or dough-manufacturing station, with a presalted-flour bin 11, a yeast bin 12 and a kneader 13. The bin 11 is connected via a pipe 14 to a reserve 15, the outlet of which is fitted with a vibrator 14a, whereas a screw 14b set in rotation by a motor 16 controls the restocking of the bin 11 in response to a signal supplied by a "bottom level" sensor and interrupts it when a "top level" is reached. Associated with the outlet hopper 11a of the bin 11 are a screw 17 driven by a motor 18 in order to control the quantity of salted flour delivered by the hopper, and a rotary comb device 19, driven by the same motor, and which is intended to prevent "bridging" of the said hopper, similar means, namely a screw 20 driven by a motor 21, being associated with the yeast bin 12 in order to control the quantity of powdered yeast delivered. The latter is fed via a pipe 22 which is extended by a pipe 23 where the flour coming from the bin 11 is introduced.

Figure 3:
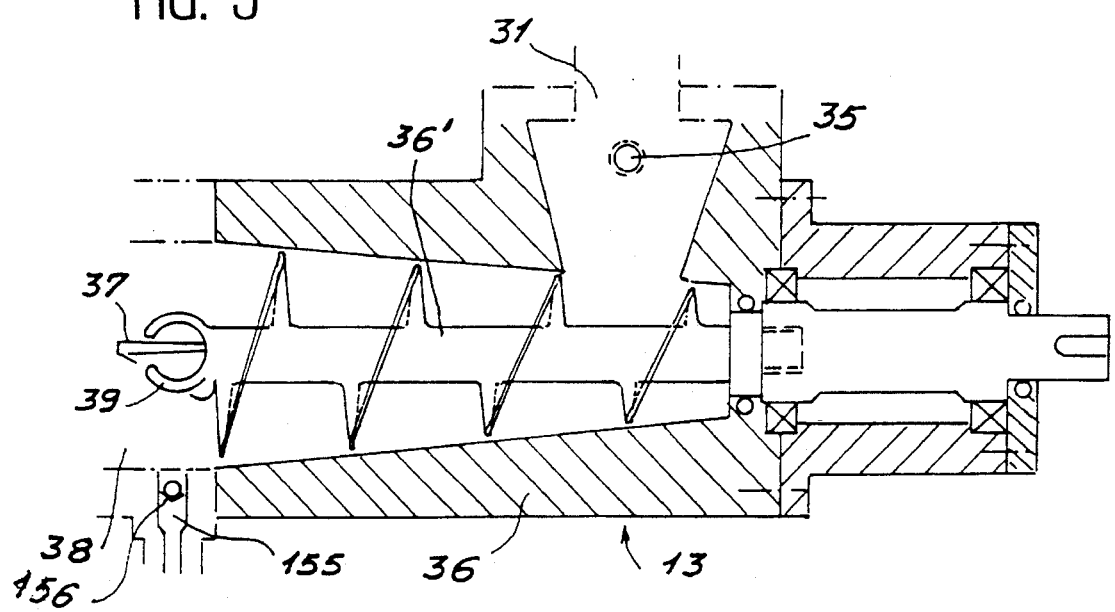
FIG. 3 is a diagrammatic view, in section, of the kneader.
Figure 3A:
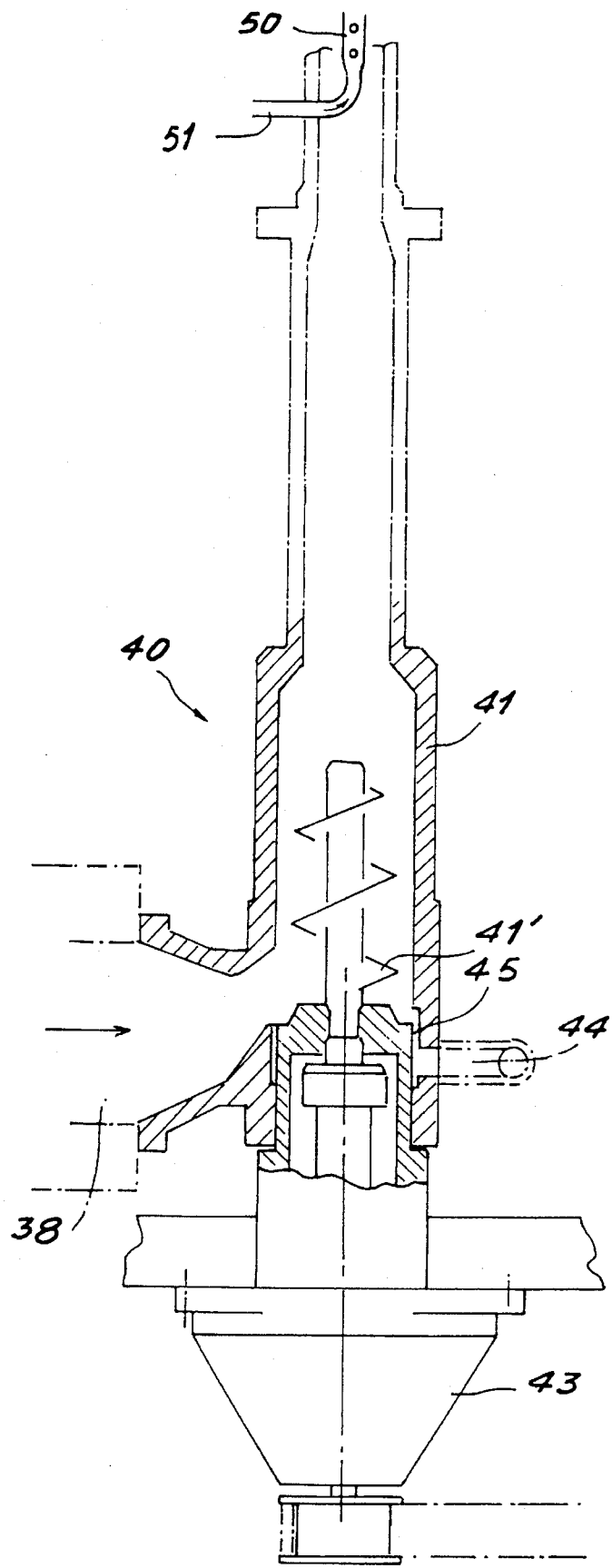
FIG. 3A is a diagrammatic view, in longitudinal section, of a dough-pump device.

At the downstream end of the pipe 23, in the direction of flow of the flour and of the yeast which travel under gravity therein, a valve 30 enables the said pipe to be isolated from the inlet 31 of the kneader 13. The latter, FIG. 3, which makes it possible continuously to mix salted flour, yeast and water heated by a coil S and supplied via a pipe 35, connected to a motor-driven pump 35a via a tubular element 35b, comprises, in a body 36, a tapered screw 36' including, at its downstream end, in the direction of travel of the dough, a mixing finger 39 and a blade 37 permitting the essential cleaning of the kneader, the outlet 38 of which constitutes the inlet of a device 40, FIG. 3A, for feeding the dough towards a station 55 for cutting up and shaping the latter, by means of a flexible and deformable pipe 42. Associated with the device 40, constituted by a pump body 41 in which a screw 41' driven by a motor 43 is mounted so as to rotate, is a tubular element 44 which emerges into a peripheral counterbore 45 of the pump body and which is connected to a source of pressurised water provided for the cleaning of the device, as will be explained hereinbelow. The kneader 13 and the device 40 thus form an atmospheric kneader/pump, the operation of which, contrary to that of the known extrusion devices, does not take place at high pressure, so that the dough which the atmospheric kneader/pump device 13–40 delivers has the characteristics of dough of the usual panification processes, resulting in a quality of the products manufactured which is similar to that of the said products. Provision is made in the pump body 41 for a pressure sensor 54, by means of which the quantity of dough supplied by the pump 40 to the cutting device 55 is regulated.

The flexible pipe 42, in which is mounted, in order to clean it, a fine perforated tube 50, which is connected via an end-fitting 51 to the source of pressurised water, terminates at its downstream end, in the direction of travel of the dough shown by the arrow f, in a station 55 for cutting up and shaping the said dough into individual dough pieces p. As FIGS. 4, 5 and 6 clearly show, the station 55 essentially comprises a carriage 60 pierced by a through-channel 61, which is vertical under the conditions of normal use of the machine and the upper end of which, FIG. 6, emerges into an end-fitting 62 on which the flexible pipe 42 is mounted. The carriage 60 is constructed so as to move with a to-and-fro translational movement transversely to the longitudinal direction of the machine, that is to say in the directions of the double arrow t, FIGS. 5 and 5A, when a motor 66 connected to a rack-and-pinion assembly 67, 68 is put into operation, the carriage being guided by slide-shafts 63 and 64.

Figure 4:
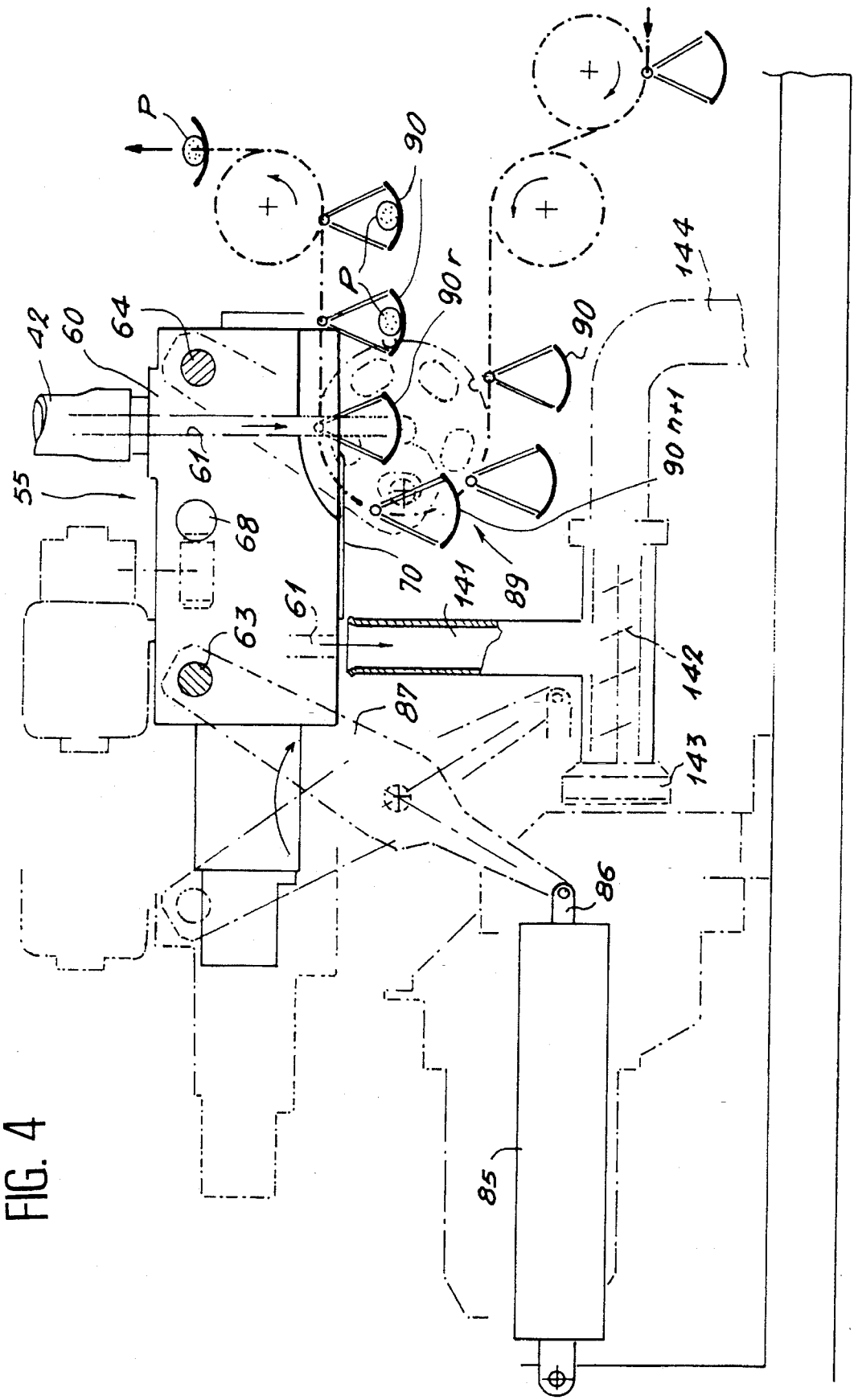
FIG. 4 shows, diagrammatically, and in side view, the means for cutting the dough and for putting down the dough pieces into the receptacles which make them travel through the machine.
Figure 5A:
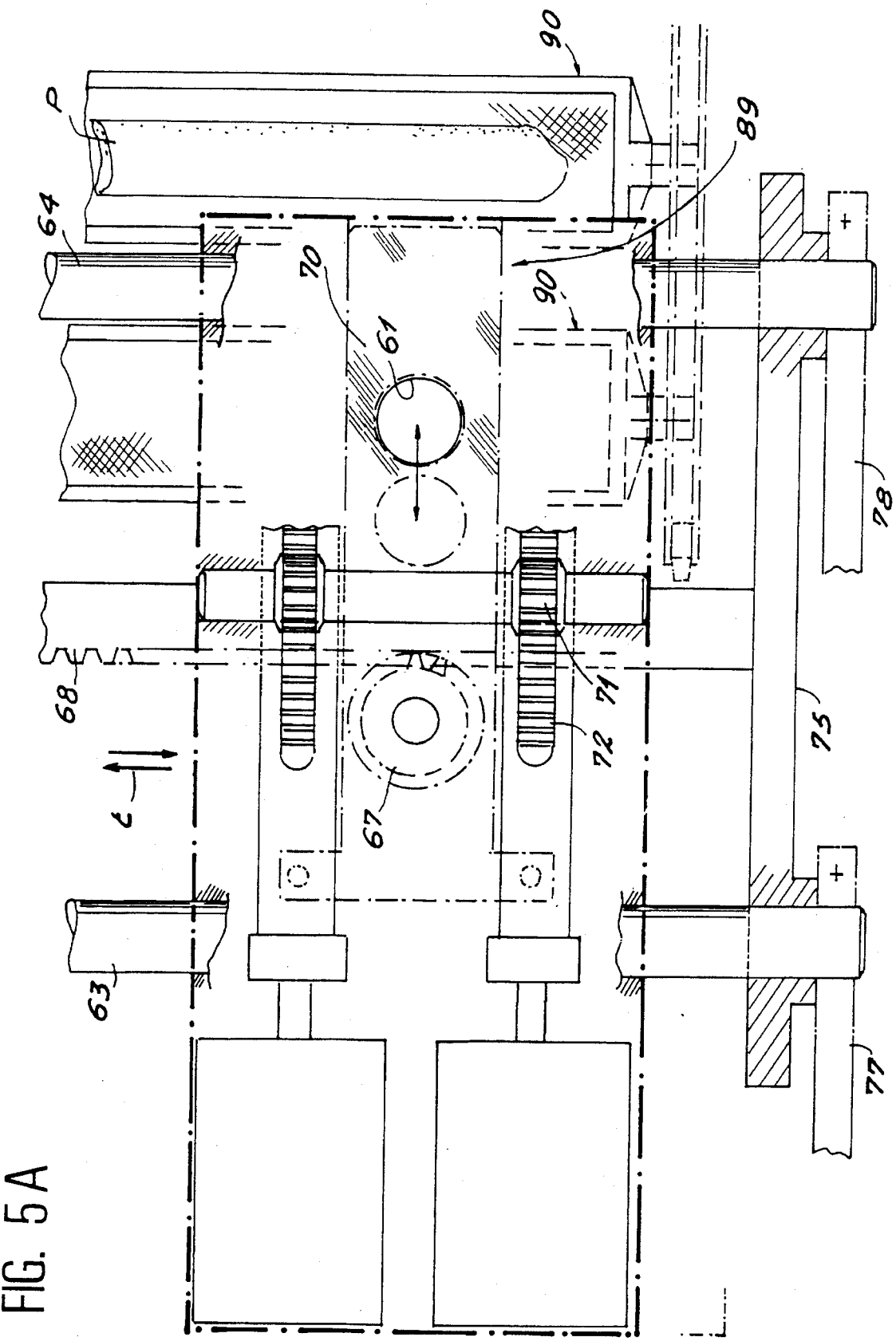

Beneath the lower face of the carriage 60 is arranged a cutting blade or cutter 70, FIGS. 5A and 6, suitable for closing off the lower outlet of the channel 61 in order to cut up the continuous dough sausage, T, coming from the pipe 42 and which has passed through the said channel 61. The cutter blade 70, treated so as not to stick to the dough, is driven in a reciprocating to-and-fro movement in the direction of the double arrow c, FIG. 6, by a double toothed-pinion (such as 71)/rack (such as 72) system, one of which is "pulling" and the other "pushing" and which are coupled to the blade by fingers such as 73. The carriage 60, with the cutting blade 70 with which it is associated, is installed in the machine according to the invention so as to occupy two positions shown diagrammatically in FIG. 4, one in solid lines and the other in dotted lines, and which correspond, respectively, to the said "working" position in which the carriage cuts the continuous dough sausage T which it receives via the pipe 42, in order to form dough pieces p and to put these down onto receptacles or swing trays 90, in a manner which will be described hereinbelow, and the other (in dotted lines) of which corresponds to a cleaning position.

More precisely, the slide shafts 63 and 64 which guide the translational-sliding movement of the carriage 60 in the direction of the double arrow t are joined together at their ends by cross-members 75 and 76 on the one hand, and are received, on the other hand, in crank arms 77, 78, 79 and 80, which are themselves mounted so as to pivot about shafts 81, 82, 83 and 84 on the frame M of the machine, FIG. 5, so that, in response to the actuation of an actuator cylinder 85, the red 86 of which is coupled to the slide shaft 63 via a crank 87, the carriage can pass from the position shown by the solid lines in FIG. 4 to that shown by the dotted lines, thus freeing the zone 89 where the swing trays 90 receive, normally, the dough pieces p.

The said zone 89 is that where the receptacles or swing trays 90, rigidly connected to two endless chains 91 and 91a, arrive beneath the lower outlet of the through-channel 61 of the carriage 60 and of the blade 70 associated with it, each swing tray receiving, at the outlet of the channel 61, a certain quantity of dough, which quantity is determined by the speed of movement of the carriage along the direction of the double arrow t, on the one hand, and the actuation of the cutter 70 on the other hand. Thus, and by appropriate programming, an actuation of the cutting blade 70 causes quantities of dough with the shape of long rolls are put down into the swing trays 90, as shown in FIG. 5A, whereas a repeated actuation of the cutter 70 during the outward travel as well as the return travel of the carriage puts down quantities of dough corresponding to "round" rolls, $P_i$, $P_{i+1}$, $P_{i+2}$, etc., FIG. 5, onto the swing trays 90.

In accordance with the invention, the manufacture of the dough, together with its cutting and putting-down into the swing trays 90, are performed within a predetermined temperature range, advantageously of the order of 30° to 40° C. and, in order so to do, the machine comprises temperature-regulating means shown diagrammatically as 53, FIG. 1.

Irrespective of the shape of the dough pieces p put down at the station 55 and in the zone 89 by the carriage 60/cutter-blade 70 device, before fermentation of the dough, the swing trays 90 are conveyed from the station 55 inside a fermentation chamber 100, FIG. 1, heated by electrical resistance elements 101 in the vicinity of which is placed the coil S for heating the water for kneading and where the swing trays travel along a sinuous path defined by toothed return wheels such as $102_1$, $102_2$, etc., at the top part of the chamber and $103_1$, $103_2$ etc., at the bottom part, the driving of the two synchronous chains 91 and 91a being controlled by a motor system 105, FIG. 1.

Upon leaving the fermentation chamber 100, the swing trays 90 loaded with "risen" dough enter an oven 110 which is not completely closed at the bottom part, whilst however being almost completely closed off by the swing trays which act as closure members. A lagged chamber 111 surrounds the oven 110 on its lateral walls and at the top part, in order for the relatively high temperature, of the order of 220° to 280° C. which prevails in the said oven, to have no influence on the temperature prevailing in the fermentation chamber or in the actual dough-manufacturing part.

The path of the swing trays 90 in the oven 110, distinctly shorter than that of the said swing trays in the fermentation chamber 100, causes the dough pieces p to be baked at the most appropriate temperature for the products being manufactured, the said temperature being regulated by means of a probe 112, which acts on heating resistance elements, such as 113 and 114, the first being adjacent to the lateral walls of the oven and the second to its lower part where an air-circulating fan 115 is also provided.

Figure 7:
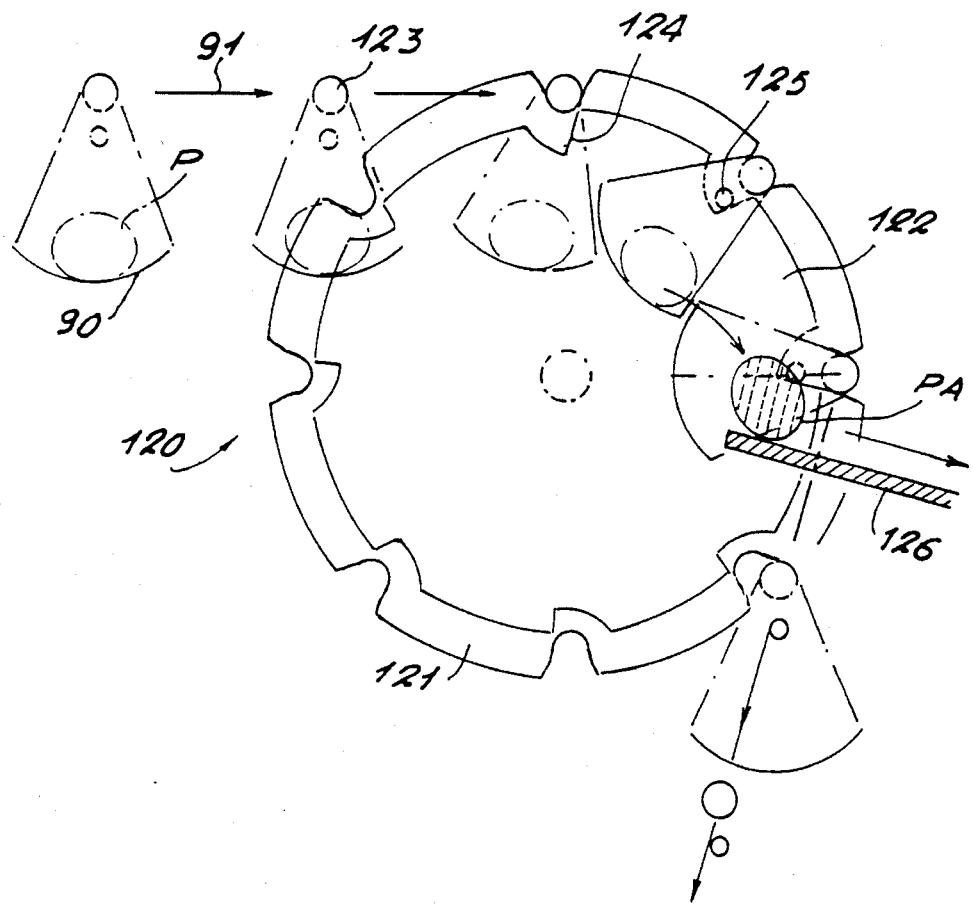
FIG. 7 shows, diagrammatically, means causing the turning-over of the swing trays at the outlet of the machine.

Upon leaving 116 the oven 110 at exit 116, the swing trays firstly travel in a zone 117 and then in a zone 118 for removing the manufactured products, which zone comprises, at the top part, means shown as 120, FIGS. 1 and 7, for causing the swing trays 90 to turn over and thus for ensuring that the baked bread products are effectively unloaded from the swing trays so that, on the return side b of the chains 91 and 91a, the said swing trays are empty and suitable once again for receiving, upon their arrival at the station 55 and in the zone 89, new masses of dough for a continuous operation of the machine.

As FIG. 7 shows, the means 120 essentially comprise a toothed wheel 121 coaxial with a notched wheel 122, the first receiving the pins 123 for hinging the swing trays onto the chains 91 and 91a, while the second, the notches of which, such as 124, interact with studs such as 125 associated with the platforms, causes the latter to be turned over and the manufactured products PA to drop onto an inclined plane 126 from where the said products are conveyed towards receiving bread bins arranged at the outlet of the machine.

This machine, as shown diagrammatically in FIG. 1, is enclosed in a sheet-metal casing or shell 130, the part of which close to the bins 10 and 11 comprises control and programming panels and the electrical power installations, while on the external sheet-metal casing or shell 130 are provided means of connection to an electric power source, shown diagrammatically as 131, means for supplying water, shown diagrammatically as 132, and means for draining the waste water, shown diagrammatically as 133.

A machine according to the invention, equipped with approximately 300 swing trays and whose overall dimensions are of the order of 1×2×3.5 m for a weight of approximately 1600–1900 kg can supply 800 individual rolls per hour.

Such a machine can also be easily transported in order to permit a supply of famine-struck populations or populations victim of a natural or other disaster or, under conditions of normal use, be moved without difficulty between its place of construction and its place of use, for example a ship where only little space is available, or alternatively be used as a mobile industrial manufacturing unit.

The operation of a machine according to the invention stems immediately from the above. After the bins 11 and 12 have been loaded with salted flour and yeast respectively, and after the machine has been connected via its means 131 to an electric power source and via its means 132 and 133 to a circuit for supplying water and for draining waste water, an operator displays, on a control and programming panel, the nature, number, quantity, etc. of the products which are to be manufactured. Using the instructions received, the programming devices control the motors 18 and 21 driving the screws associated with the outlet hoppers of the bins 11 and 12 and pre-established quantities of salted flour and yeast are then continuously fed into the pipe 23, the height of which, between the outlet of the bins and the inlet 31 into the kneader 13, is of the order of some twenty centimeters.

The salted flour and yeast which enter the kneader 13 are then mixed therein with a predetermined quantity of heated water in order to manufacture, continuously, a dough taken up, upon leaving the kneader, by the pump 40, the combination of the kneader 13 and pump 40 forming an atmospheric kneader/pump device which delivers the dough, thus mixed and kneaded, via the flexible pipe 42 towards the station 55 for cutting up the said dough and for putting it down, in the form of dough pieces p, into the swing trays 90. The carriage 60, initially in the condition shown by the solid lines in FIG. 5, on the one hand, and in its working condition, also shown by the solid lines in FIG. 4, on the other hand, then moves in the direction of the chain 91a, while the actuation of the cutter blade 70, which cuts up the dough sausage T, forms dough pieces p put down during forward travel onto a swing tray $90_n$, which is then stationary, and then during the return of the carriage onto a swing tray $90_{n+1}$, this also being stationary, and which has taken the place of the swing tray $90_n$ which has moved, meanwhile, getting closer to the fermentation chamber.

In one embodiment of the machine, each of the swing trays 90 remains immobilised at the station 55 for approximately 18 seconds and then progresses for 3 seconds in order to be replaced by the next swing tray.

Upon leaving the zone 89, which is that where the swing trays 90 are provided with dough pieces p, the said swing trays follow a short horizontal path and then enter the fermentation chamber 100 where they are conveyed, by moving vertically, from the bottom up, and then from the top down, then from the bottom up, etc., along a sinuous path travelled at a speed such that the dough pieces reside in the said fermentation chamber maintained at a constant temperature, of the order of 40° C., for an average period of the order of one hour, the fermentation phase being followed by that of baking in the oven 110. After leaving the oven 110, the swing trays guided on a short horizontal path, resume a vertical ascending movement in the zone 117 and then reach the zone 118 in the vicinity of the outlet of the machine where the swing trays are unloaded and the manufactured products removed.

The total duration of the manufacturing cycle lies between approximately 1 hour 40 minutes and 2 hours.

Figure 8:
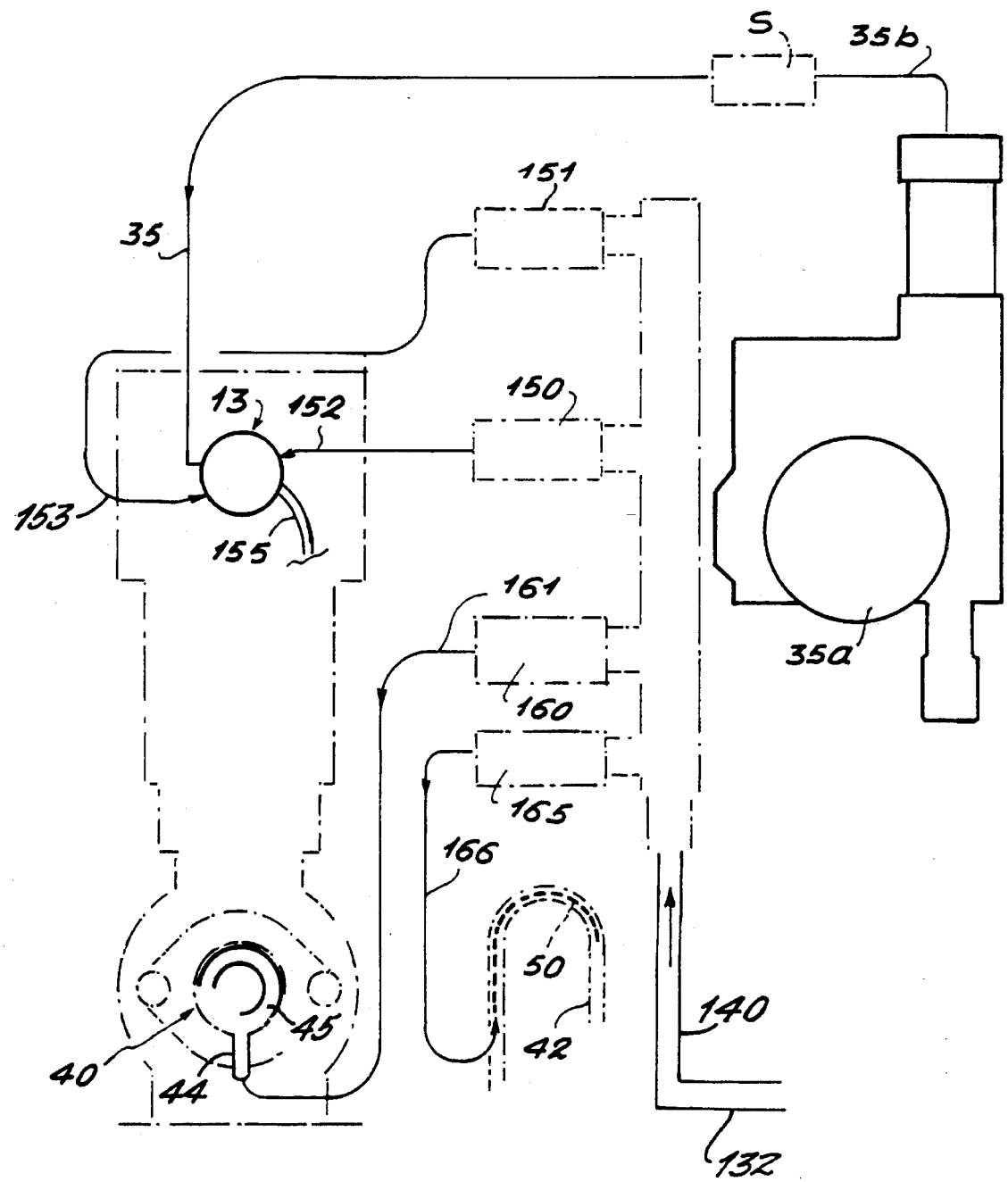
FIG. 8 shows, highly diagrammatically, the circuit for supplying water to a machine according to the invention.

After a given operating time, the invention makes provision for a cleaning procedure. The latter is carried out using clarified water from a mains pipe 140, FIG. 8, connected via means 132 to the drinking-water supply. More precisely, the invention makes provision, when a cleaning phase has to be initiated, for progressively reducing the quantity of flour which is extracted from the bin 11 whilst keeping the quantity of water injected into the kneader constant, so that the consistency of the dough coming from the atmospheric kneader/pump 13–40 is increasingly more fluid over a pre-established delay period which enables the dough with normal consistency, present downstream of the pipe 42, to be used. When the delay time has elapsed, the carriage 60 is moved using the actuator cylinder 85 in order to bring it into the condition shown by the dot-dashed lines in FIG. 4, in which position the through-channel 61 is vertically in line with a vertical chute 141 fitted, at its lower part, with a cleaning-water draining pump 142 driven by a motor 143 and the outlet 144 of which is connected to the means for draining the waste water which are shown as 133. When the carriage 60 is in this position, the opening of a solenoid valve 165, connected to a clarified-water pipe 140, ensures, by means of a tubular element 166 connected to the end-fitting 51, the cleaning of the flexible pipe 42 by means of the perforated fine tube 50 and that of the through-channel 61, the dough having fluid consistency coming from the atmospheric kneader/pump being easily drained by the pump 142. After stopping the supply with flour and yeast to the kneader 13, by closing the valve 30, the solenoid valves 150 and 151, FIG. 8, are made to operate, these being connected to the clarified-water pipe 140. Opening the solenoid valve 150 then forcibly injects into the kneader 13, via a tubular element 152, the cleaning water in the region of the screw 36', whereas opening the solenoid valve 151 forcibly injects, via a tubular element 153, the cleaning water onto the blade 37, the draining flow being provided by a pipe 155 whose outlet into the kneader 13 is closed by a valve element 156, FIG. 3.

For the cleaning of the pump 40, it is a solenoid valve 160 which is made to operate and which injects the cleaning water, via a tubular element 161 and then via the pipe 44 into the counterbore 45 of the pump body. Such an arrangement ensures complete and total peripheral cleaning of the pump and of all the parts of the machine where the dough flows.

After cleaning the machine, in the manner which has just been described, the manufacturing run may once again be started, by bringing back the carriage 60 into its operating position, by operating the actuator cylinder 85 and then by opening the valve 30 for supplying the kneader, for a continuous manufacture, as explained hereinabove, the said manufacture taking place screened from impurities in the machine enclosed in its shell 130.

I claim:

1. A bread-manufacturing machine characterised in that it comprises:

at least one salted-flour bin (11) and at least one yeast bin (12);

means (17, 20) for controlling the quantities of salted flour and yeast which are delivered from these bins;

means (22, 23) for feeding the flour and yeast towards a kneading means (13) where the necessary water is also supplied in appropriate quantity;

pump (40) and transfer means (42) for continuously feeding kneaded and mixed dough towards a cutting device (60, 70) in order to form dough pieces (p);

self-cleaning means integrated into the kneader means/pump, and means for the cleaning of said transfer means (42) for feeding the dough and of the device (60) for cutting it;

receptacles (90) for the dough pieces (p), connected to conveyor means (91, 91a) which make them travel first along a sinuous path in a fermentation chamber (100) and then in an oven (110); and means (120) for controlling the unloading of said receptacles (90) and to ensure that they are empty before said receptacles, continuing their movement, are brought again to a loading station (55) for dough pieces (p).

2. Bread-manufacturing machine according to claim 1, characterised in that feeding of the flour and yeast is by gravity and wherein the transfer means is a deformable pipe (42).

3. Bread-manufacturing machine according to claim 1, characterised in that the water supplied to the kneading means/pump (13, 40) is at a pre-established temperature and is heated using a coil (S) advantageously placed in the vicinity of means (101) for heating the fermentation chamber (100).

4. Bread-manufacturing machine according to claim 1, characterised in that the receptacles for the dough pieces are swing trays (90), the longitudinal ends of which are rigidly attached to two synchronous chains (91, 91a) forming said conveyor means with, at the outlet of the machine, toothed and notched wheels (121,122) causing the said swing trays to turn upside down in order to unload baked bread products effectively.

5. Bread-manufacturing machine according to claim 1, characterised in that it comprises means (53) for regulating the temperature in a dough-manufacturing zone in order to keep the said temperature within a predetermined range.

6. Bread-manufacturing machine according to claim 5, characterised in that the said means keep the temperature of the dough-manufacturing zone at a value lying between approximately 30° and 40° C.

7. Bread-manufacturing machine according to claim 1, characterised in that a pressure sensor (54) is connected to the kneading means/pump (13, 40) in order to regulate the quantity of dough supplied by the pump (40) to the cutting device (60, 70).

8. Bread-manufacturing machine according to claim 1, characterised in that it comprises programming means so that it operates automatically according to a cycle selected from a multiplicity of those offered to the user, such as the shape and weight of the bread products, their composition, the hours of operation, in particular the start-up times of the machine, the counting of the manufactured products, the cleaning cycles, etc.

9. Bread-manufacturing machine according to any one of claim 1, characterised in that the integrated means for the self-cleaning of the kneading means/pump (13, 40) comprise means for the cleaning of a screw (36') of the kneader (13), of an end blade (37) of said screw and of a mixing finger (39), together with means for peripheral cleaning of the pump (40).

10. Bread-manufacturing machine according to any one of claim 1, characterised in that the means for the cleaning of the transfer means (42) for feeding the dough and of the device (60) for cutting the dough include a chute (141) and a pump (142, 143) for draining cleaning water flowing into a channel (61) passing through a movable carriage (60) when the latter is in a cleaning position.

11. A bread manufacturing machine according to claim 1 characterized in that for a cleaning phase said self-cleaning means comprises means for modifying a ratio of a flour/yeast/water mixture to render the continuously kneaded and mixed dough more fluid and means for carrying out after a delay period a washing operation with clarified water.

* * * * *